United States Patent Office 3,099,670
Patented July 30, 1963

3,099,670
ADDITION OF SILICON HYDRIDES TO ALIPHATICALLY UNSATURATED ORGANIC COMPOUNDS
Maurice Prober, Schenectady, N.Y., assignor to General Electric Company, a corporation of New York
No Drawing. Filed Dec. 31, 1953, Ser. No. 401,702
15 Claims. (Cl. 260—448.2)

This invention relates to the addition of silicon hydrides to aliphatically unsaturated organic compounds in the presence of catalytic amounts of tertiary amines. More particularly, this application relates to the addition of silicon hydrides having the formula:

(1) $\quad\quad\quad Si(H)_{4-m-n}(X)_n(Z)_m$ where $n$ is an integer equal to from 2 to 3, inclusive, and preferably is equal to 3, $m$ is one of the following: 0, 1; the sum of $m$ and $n$ is at most 3; X is halogen, e.g. chlorine, fluorine, bromine, etc., and Z is an alkyl radical, e.g., methyl, ethyl, propyl, butyl, etc., to organic compounds having acetylenic and olefinic unsaturation such as phenyl acetylene and compounds having the formula:

(2) 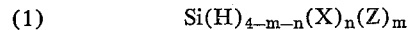

where R is an electron-attracting group, e.g.,

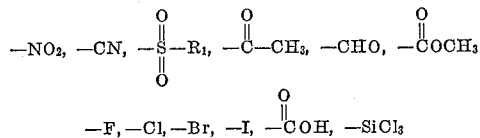

and R', R" and R''' are the same or different members of the class consisting of electron-attracting groups as defined for R; hydrogen; alkyl radicals, e.g., methyl, ethyl, propyl, butyl, etc., radicals; aryl radicals, e.g., phenyl, diphenyl, etc., radicals; aralkyl radicals, e.g., benzyl, phenylethyl, etc., radicals; alkaryl radicals, e.g., tolyl, xylyl, etc., radicals, and $R_1$ is a monovalent hydrocarbon radical of the same scope as R', R" and R'''.

Previously, trichlorosilane has been added to olefins using peroxide catalysts or high temperature reactions. The peroxide-catalyzed addition is disadvantageous in that there is danger of the olefin being polymerized by peroxides. The high temperature methods require temperatures of from about 160° C. to 400° C. and at these temperatures many olefins undergo thermal condensation.

Unexpectedly it has been discovered that silicon hydrides may be added to acetylenes and certain olefins in the presence of tertiary amines under relatively mild reaction conditions which minimize the danger of polymerization of the olefins. The tertiary amines which have been found suitable for the practice of the present invention are (1) those having the general formula:

(3) 

where K, K' and K" are the same or different members of the group consisting of alkyl radicals, e.g., methyl, ethyl, propyl, isopropyl, butyl, amyl, octyl, etc., radicals; aryl radicals, e.g., phenyl, diphenyl, etc., radicals; cycloalkyl radicals, e.g., cyclopentyl, cyclohexyl, etc., radicals; and (2) heterocyclic tertiary amines having nitrogen in the heterocyclic ring. Tertiary amines suitable for the practice of this invention include, for example, trimethylamine, triethylamine, tri-n-propylamine, tri-n-butylamine, tri-n-amylamine, trioctylamine, n-propyl-di-n-butylamine, di-n-butyl-n-amylamine, γ-collidine, N-ethylpiperidine, N-ethylmorpholine, etc.

Examples of silicon hydrides which are within the scope of Formula 1 above which may be added to unsaturated organic compounds include, for example, dichlorosilane, trichlorosilane, trifluorosilane, tribromosilane, methyldichlorosilane, ethyldifluorosilane, etc. The addition of the silicon hydride to the unsaturated organic compound is believed to take place by the cleavage of the Si—H bond and the subsequent addition of the Si and H across the unsaturated olefinic or acetylenic bond.

Contrary to expectations, it has been discovered that the addition of the present invention will not take place with all olefins. The addition will take place only with those olefins having at least one electron-attracting group attached to an olefinic carbon. Such compounds are defined by Formula 2 above. When an attempt is made to add a silicon hydride to an olefin containing no electron-attracting groups, no addition will take place. For example, trichlorosilane will not add to vinyl acetate or octene-1 since both the acetate and the hexyl radicals are electron repelling. Chemical groups have long been classified into electron-attracting groups and electron-repelling groups [see page 568, Fieser and Fieser, "Organic Chemistry," published by D. C. Heath and Company, Boston (1944)]. This invention deals only with olefins containing electron-attracting groups attached to olefinic carbon. Such compounds include, for example, 2-methyl-1-nitropropene-1, acrylonitrile, methacrylonitrile, vinyl methyl sulfone, methyl acrylate, tetrafluoroethylene, chlorotrifluoroethylene, etc. With acetylenic compounds, either one or two molecules of silicon hydride may be added across the triple bond. Suitable acetylene compounds include, for example, phenyl acetylene, dichloroacetylene, diphenylacetylene, cyanoacetylene, etc.

Compounds which may be made by the process of the present invention include, for example,

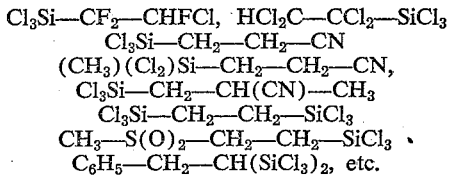

The addition of silicon hydrides to unsaturated organic compounds in the presence of most tertiary amines may be carried out at atmospheric pressure. For example, the hydride, unsaturated compound, and the catalyst may be placed in any suitable container with a reflux column attached. The solution is then heated at its reflux temperature for as long as is necessary to complete the reaction. In most cases where the reaction is exothermic the unsaturated compound is added slowly to a solution of the catalyst in the silicon hydride to prevent overheating of the reaction mixture. The temperature at which reflux occurs varies, of course, with the constituents. It has been found that generally the reflux temperature using trichlorosilane is within the range of from about room temperature (i.e., about 25° C.) to about 130° C.

Where the catalyst used is trimethylamine or triethylamine, a complex is apparently formed with the silicon hydride which is stable under reflux conditions. Therefore, when using one of these two tertiary amines as catalysts, it is advantageous to carry out the reaction in a pressure vessel at temperatures above 100° C., preferably at a temperature of about 120° C. The pressure in the vessel will usually be in the range of 50 to 250 p.s.i. at a temperature of about 120° C.

In carrying out my reaction, the proportion of silicon hydride and unsaturated compound may vary within wide limits. Thus, when the unsaturated compound has one olefinic double bond, the molar ratio of hydride to olefin may vary from about 0.5:1 to about 5:1. When the unsaturated compound has one acetylenic triple bond, the molar ratio of hydride to acetylene may vary from about 0.5:1 to 5:1. Preferably I use stoichiometric proportions so that the ratio of hydride to olefin is 1:1 and the ratio of hydride to acetylenic triple bond is 2:1 when complete addition is desired.

The concentration of tertiary amine catalyst used in the practice of this invention may vary from about 0.5% to above 15% catalyst based on the total weights of the hydride and unsaturated compound. Preferably, the catalyst varies from about 2% to 10% of the weights of the other reactants. After the reaction has taken place, the reaction product may be separated by fractional distillation.

The various tertiary amines described as suitable catalysts differ somewhat in their degree of effectiveness and, in general, trialkylamines are the preferred catalysts. The data of the table below were obtained by adding a solution of 0.025 mole of each amine in 0.5 mole of acrylonitrile to 0.5 mole of trichlorosilane and refluxing the solution for 24 hours. The reaction mixture was then rectified and the addition product was isolated. The percent yield was then calculated based on the acrylonitrile charged.

TABLE I

| Amine catalyst: | Percent yield |
|---|---|
| Triethylamine | 1.5 |
| Tri-n-propylamine | 48 |
| Tri-n-butylamine | 56 |
| Tri-n-amylamine | 33 |
| Trioctylamine | 45 |
| γ-Collidine | 16 |
| N-ethyl-piperidine | 16 |
| N-ethyl-morpholine | 10 |

As shown by Table I, the yield of addition product with triethylamine at atmospheric pressure and reflux temperature is very low. As explained above, this is because a complex forms between the triethylamine and trichlorosilane unless higher temperatures and pressures are used.

Table I also shows that the yields using trialkylamines are better than the yield using heterocyclic tertiary amines. Even though the yields with heterocyclic tertiary amines are lower than with the trialkylamines, the heterocyclic amines present a vast improvement over the prior art, since if no amine catalyst at all is used, the yield of addition product will be negligible.

The following examples are illustrative of the practice of my invention and are not intended for purposes of limitation.

*Example 1*

To a solution of 1.9 grams tri-n-butylamine in 40.7 grams (0.3 mole) of trichlorosilane was added 15.9 grams (0.3 mole) of acrylonitrile and the solution was refluxed for 41.5 hours. The reactants were distilled to remove the unreacted starting materials and the residue was vacuum distilled to yield 25.5 grams β-cyanoethyltrichlorosilane which boiled between 89 and 93° C. at 10.7 mm. Analysis showed the product to contain 55.8% chlorine (theoretical: 56.4% chlorine).

*Example 2*

106.0 grams (2.00 moles) of acrylonitrile was slowly added to a solution of 18.9 grams (0.1 mole) of tri-n-butylamine in 271.0 grams (2.00 moles) of trichlorosilane. The solution was then refluxed for 24 hours and the reaction mixture was distilled until the boiling point of the residue reached 100° C. The residue was then vacuum distilled and 267.2 grams of a fraction distilling at 72 to 102° C. at 10 to 11 mm. was collected. Most of this fraction boiled at 87 to 91° C. The fraction solidified at room temperature and an upper liquid layer of 11.5 grams was decanted off. The remainder was rectified and there was obtained 212.3 grams of β-cyanoethyltrichlorosilane boiling at 92.5° at 13 mm. to 83° C. at 7 mm. Analysis of this fraction showed it to contain 7.44% nitrogen and 56.4% chlorine. (Theoretical: 7.43% nitrogen, 56.43% chlorine.)

*Example 3*

67.8 grams (0.5 mole) of trichlorosilane was placed in a reaction vessel. A solution of 9.26 grams (0.05 mole) of tri-n-butylamine and 28.0 grams (0.5 mole) of methyl acrylate was added to the vessel. There was an initial vigorous reaction and after refluxing for 24 hours the temperature had risen from 48 to 92° C. The vessel was then allowed to cool and 36 grams of volatiles were removed by evacuating the vessel at 1.5 mm. at room temperature. The residue was then vacuum distilled yielding 17.9 grams of product boiling at 74 to 95° C. at 3 mm. Analysis of this product showed it to contain 57.3% hydrolyzable chlorine. (Theoretical for $$CH_3—O—C(O)—CH_2—CH_2—SiCl_3$$

48.2% chlorine.) The high chlorine content can be accounted for by assuming some of the methoxy groups were replaced by chlorine to form $Cl_3S—CH_2—CH_2—C(O)Cl$, theoretical chlorine 62.8%.

*Example 4*

A stainless steel bomb was charged with 70 grams (0.60 mole) of chlorotrifluoroethylene, 71.2 grams (0.60 mole) of trichlorosilane and 3.2 grams (0.018 mole) tri-n-butylamine and heated at 125° C. for 64 hours. The volatile products were vented and the residue was distilled at atmospheric pressure up to a boiling point of 81° C. The residue was vacuum distilled, yielding the following fractions: (1) 2.0 grams of product boiling at 60 to 65° C. at 42 mm.; (2) 5.1 grams of product boiling at 140 to 150° C. at 40 mm.; (3) 8.0 grams of product boiling at 130 to 140° C. at 15 mm. Hydrolyzable chlorines for these fractions were: (1) 45.5%; (2) 46.3%; (3) 49.7%. Theory for the 1:1 adduct, $Cl_3Si—CF_2—CHFCl$, is 42.2% assuming only hydrolysis of the silicon-chlorine bonds. Although the chlorine for fraction (1) is higher than theory, the high hydrolyzable chlorines indicate that the addition took place.

*Example 5*

To 67.8 grams (0.50 mole) of trichlorosilane was added a solution of 9.26 grams (0.05 mole) of tri-n-butylamine in 83.0 grams (0.50 mole) of tetrachloroethylene. After refluxing for 24 hours the pot temperature had risen from 55° C. to 89° C. After stripping off the lower boilers, vacuum distillation yielded 23.3 grams of product boiling at 80 to 104° C. at 5 mm. Hydrolyzable chlorine in this distillate was found to be 41.5%. Theory for $Cl_3Si—CCl_2—CHCl_2$ is 35.3% hydrolyzable chlorine. In the presence of tri-n-butylamine the adduct may undergo dehydrochlorination to form $Cl_3Si—CH=CCl_2$, hydrolyzable chlorine 40.47. Another possibility is that the adduct may lose a β-chlorine as hydrolyzable chlorine, giving a hydrolyzable chlorine content of 47.1%.

*Example 6*

A three-necked flask equipped with a thermometer, dropping funnel, stirrer and reflux condenser was charged with 536.6 grams (8.00 moles) of methacrylonitrile and 74.2 grams (0.400 mole) of tri-n-butylamine. 1084 grams (8.00 moles) of trichlorosilane was added to the stirred solution over a 1.5 hour period. The solution was refluxed for 112 hours, reaching a pot temperature of 97° C. Anhydrous hydrogen chloride (0.400 mole) was passed into the stirred solution and the reaction mixture was distilled yielding 859.1 grams of a fraction boiling between 70 and 145° C. at 6 mm. Rectification of this fraction yielded 708.2 grams of β-cyanopropyltrichlorosilane, boiling at 88° C. at 8 mm. and having a refractive index $n_D^{20}$ 1.4595. Analysis of this compound showed the presence of 52.1% chlorine and 6.85% nitrogen. (Theoretical: 52.5% chlorine and 6.9% nitrogen.)

Example 7

67.8 grams (0.50 mole) of trichlorosilane was added to 51.0 grams (0.500 mole) of phenylacetylene and 9.3 grams (0.050 mole) of tri-n-butylamine, and the solution was refluxed for 48 hours. Distillation of the reaction mixture yielded 9.2 grams of C₆H₅—CH₂—CH(SiCl₃)₂ having a boiling point of 134° C. at 4 mm. Analysis of this material showed the composition to contain 55.1% hydrolyzable chlorine. (Theoretical: 57.1% hydrolyzable chlorine.)

Example 8

A stainless steel bomb was charged with 135.5 grams (1.00 mole) of trichlorosilane, 53.0 grams (1.00 mole) of acrylonitrile, and 5.1 grams (0.05 mole) of triethylamine and heated at 110 to 115° C. for 24 hours. The reaction product was distilled up to 100° C. at atmospheric pressure and the residue was vacuum distilled to yield 146.2 grams of β-cyanoethyltrichlorosilane which boiled between 88 and 90° C. at 10 mm.

Example 9

(CH₃)(Cl)₂Si—CH₂—CH₂—CN may be prepared by charging 1.0 mole of methyldichlorosilane, 1.0 mole of acrylonitrile and about 0.05 mole of triethylamine to a reaction bomb and heating the bomb at about 150° C. for 24 hours. The product may be isolated by the method of Example 8.

Example 10

A flask equipped with a dropping funnel, reflux condenser and thermometer was charged with 259.0 grams (1.91 moles) of trichlorosilane. To this was added a solution of 18.0 grams (0.097 mole) of tri-n-butylamine in 308.8 g. (1.91 moles) of vinyltrichlorosilane, and the solution was heated at reflux for 72 hours. The reaction product was fractionally distilled to yield 38.9 grams of Cl₃SiCH₂CH₂SiCl₃ which boiled between 91.5 and 96.5° C. at 19 mm. Ninety percent of this fraction boiled between 94 to 96.5° C. at 19 mm. A center cut of this fraction melted at 24 to 26° C. Reported data for this product indicate the boiling point to be 93° C. at 25 mm. and 199° C. at atmospheric pressure with a melting point of 27 to 28° C.

Compounds prepared in accordance with the method of my invention combine both the properties of the inorganic silicon atom with the properties of organic compounds. These materials have utility as intermediates in the preparation of organopolysiloxanes containing functional groups. The compounds prepared in accordance with this invention which contain polyfunctional silicon atoms may be hydrolyzed by well known methods to form organosilicon oils, gums and resins useful in the insulating, molding and coating arts.

What I claim as new and desire to secure by Letters Patent of the United States is:

1. The process of adding silicon hydrides to unsaturated organic compounds which comprises effecting reaction between a silicon hydride having the formula:

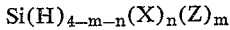
$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and a member of the group consisting of acetylenic compounds and olefinic compounds containing an electron-attracting group attached to olefinic carbon in the presence of a member of the class consisting of (1) tertiary amines of the formula:

where K, K' and K" are members of the class consisting of alkyl radicals, aryl radicals, cycloalkyl radicals, and mixtures of the aforesaid radicals, and (2) heterocyclic tertiary amines having nitrogen in the heterocyclic ring.

2. The process of adding silicon hydrides to unsaturated organic compounds which process comprises effecting reaction between a silicon hydride having the formula:

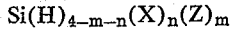
$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and a member of the class consisting of (1) acetylenic compounds and (2) an olefin having the formula:

where R is an electron-attracting group and R', R" and R'" are members of the class consisting of electron-attracting groups, hydrogen, alkyl radicals, aryl radicals, alkaryl radicals, aralkyl radicals, and mixtures of the aforesaid members, in the presence of a tertiary amine.

3. The process of adding a silicon hydride to an unsaturated organic compound which process comprises effecting reaction between (1) a silicon hydride of the formula:

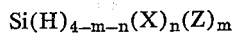
$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and (2) a member of the class consisting of acetylenic compounds and olefinic compounds having an electron-attracting group attached to olefinic carbon, in the presence of a tertiary amine.

4. The process of adding silicon hydrides to olefinically unsaturated organic compounds which comprises effecting reaction between a silicon hydride having the formula:

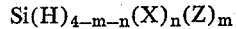
$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and an olefinic compound having an electron-attracting group attached to olefinic carbon, in the presence of a tertiary amine.

5. The process of adding silicon hydrides to olefinically unsaturated organic compounds which comprises effecting reaction between a silicon hydride having the formula:

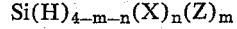
$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and an olefin having the formula:

where R is an electron-attracting group and R', R" and R'" are members of the class consisting of electron-attracting groups, hydrogen, alkyl radicals, aryl radicals, alkaryl radicals, aralkyl radicals and mixtures of the aforesaid radicals in the presence of a tertiary amine.

6. The process of adding a silicon hydride to an unsaturated organic compound which process comprises effecting reaction between (1) a silicon hydride of the formula:

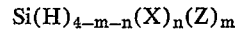
$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and (2) a member of the class consisting of acetylenic compounds and olefins having the formula:

where R is an electron-attracting group and R', R" and R''' are members of the class consisting of electron-attracting groups, hydrogen, alkyl radicals, aryl radicals, alkaryl radicals, aralkyl radicals, and mixtures of the aforesaid radicals in the presence of a tertiary amine selected from the class consisting of (a) tertiary amines having the formula:

$$K-\underset{\underset{K''}{|}}{N}-K''$$

where K, K' and K" are members selected from the class consisting of alkyl, aryl and cycloalkyl radicals, and (b) heterocyclic tertiary amines having nitrogen in the heterocyclic ring.

7. The process of adding a silicon hydride to an olefinic compound which comprises effecting reaction between (1) a silicon hydride having the formula:

$$Si(H)_{4-m-n}(X)_n(Z)_m$$

where $n$ is an integer equal to from 2 to 3, inclusive, $m$ is one of the following: 0, 1; the sum of $m+n$ is at most 3; X is halogen, and Z is an alkyl radical, and (2) an olefinic compound having the formula:

$$\underset{\underset{R'}{|}}{\overset{\overset{R}{|}}{C}}=\underset{\underset{R'''}{|}}{\overset{\overset{R''}{|}}{C}}$$

where R is an electron-attracting group selected from the class consisting of $$-NO_2, -CN, -\underset{\underset{O}{\overset{O}{\|}}}{\overset{O}{\overset{\|}{S}}}-R_1, -\overset{O}{\overset{\|}{C}}-CH_3, -CHO, -\overset{O}{\overset{\|}{C}}OCH_3$$

$$-F, -Cl, -Br, -I, -\overset{O}{\overset{\|}{C}}OH, -SiCl_3$$

and R", and R''' are members selected from the class consisting of electron-attracting groups as defined for R, hydrogen, alkyl radicals, aryl radicals, aralkyl radicals, alkaryl radicals, and $R_1$ is a monovalent hydrocarbon radical of the same scope as R', R" and R''', said reaction being effected in the presence of a member selected from the class consisting of (a) tertiary amines of the formula:

$$K-\underset{\underset{K''}{|}}{N}-K''$$

where K, K' and K" are members selected from the class consisting of alkyl, aryl and cycloalkyl radicals, and (b) heterocyclic tertiary amines having nitrogen in the heterocyclic ring.

8. A process for reacting a silane represented by the formula $$Si(H)_{4-m-n}(X)_n(Z)_m$$

wherein $n$ is an integer equal to from 2-3, inclusive, $m$ is one of the following: 0, 1; the sum of $m$ and $n$ is at most 3; X is a halogen and Z is an alkyl radical with a nitrile of the formula $$R-CH=\underset{\underset{CN}{|}}{\overset{\overset{R'}{|}}{C}}-CN$$

wherein R is a member selected from the group consisting of hydrogen and alkyl radicals and R' is a member selected from the group consisting of hydrogen and methyl radicals in the presence of a tertiary amine.

9. A process for reacting a silane represented by the formula $$Si(H)_{4-m-n}(X)_n(Z)_m$$

wherein $n$ is an integer equal to from 2 to 3, inclusive, $m$ is one of the following: 0, 1; the sum of $m$ and $n$ is at most 3; X is a halogen, and Z is an alkyl radical with a nitrile of the formula $$R-CH=\underset{\underset{CN}{|}}{\overset{\overset{R'}{|}}{C}}-CN$$

wherein R is a member selected from the group consisting of hydrogen and alkyl radicals and R' is a member selected from the group consisting of hydrogen and methyl radicals, in the presence of a heterocyclic tertiary amine having nitrogen in the heterocyclic ring.

10. The process of making β-cyanoethyltrichlorosilane which process comprises effecting reaction between trichlorosilane and acrylonitrile in the presence of a tertiary amine.

11. The process of making β-cyanoethyltrichlorosilane which comprises effecting reaction between trichlorosilane and acrylonitrile in the presence of tri-n-butylamine.

12. The process of making $Cl_3Si-CF_2-CHFCl$ which comprises effecting reaction between trichlorosilane and chlorotrifluoroethylene in the presence of a tertiary amine.

13. The process of making $Cl_3Si-CH_2CH(CN)-CH_3$ which comprises effecting reaction between trichlorosilane and methacrylonitrile in the presence of a tertiary amine.

14. The process of making $$(CH_3)(Cl_2)Si-CH_2-CH_2-CN$$

which process comprises effecting reaction between methyldichlorosilane and acrylonitrile in the presence of triethylamine.

15. The process of making $Cl_3Si-CH_2-CH_2-SiCl_3$ which process comprises effecting reaction between trichlorosilane and vinyltrichlorosilane in the presence of tri-n-butylamine.

References Cited in the file of this patent

UNITED STATES PATENTS 2,570,462   Lipscomb _____ Oct. 9, 1951

FOREIGN PATENTS 961,878   France _____ Nov. 28, 1949